United States Patent [19]
Knapp et al.

[11] 3,734,611
[45] May 22, 1973

[54] PHOTOGRAPHIC PRINTING APPARATUS

[75] Inventors: Walter Knapp; Volker Weinert; Kurt Ramsauer, all of Munich, Germany

[73] Assignee: Agfa-Gevaert Aktiengesellschaft, Leverkusen, Germany

[22] Filed: Sept. 27, 1971

[21] Appl. No.: 184,096

[30] Foreign Application Priority Data

Sept. 30, 1970 Germany.....................P 20 48 061.9

[52] U.S. Cl. .......................355/41, 355/50, 355/68
[51] Int. Cl. .............................................G03b 27/52
[58] Field of Search............................355/50, 68, 41

[56] References Cited

UNITED STATES PATENTS

| | | | |
|---|---|---|---|
| 3,426,357 | 2/1969 | Paulus | 355/68 |
| 3,519,347 | 7/1970 | Bowker et al. | 355/68 X |

*Primary Examiner*—Samuel S. Matthews
*Assistant Examiner*—Richard A. Wintercorn
*Attorney*—Michael S. Striker

[57] ABSTRACT

The average transparency over substantially the complete surface of each negative of a film strip is measured and negatives whose so-measured transparency lies outside a predetermined range are transported past the printer without being reproduced.

12 Claims, 3 Drawing Figures

PHOTOGRAPHIC PRINTING APPARATUS

BACKGROUND OF THE INVENTION

This invention relates to photographic apparatus. In particular it relates to photographic printing apparatus wherein an automatic transport means transports elongated carrier means having a plurality of originals along a predetermined path. The transport means may be controlled by means of identifying marks in a predetermined location along the film strip relative to each of said originals, the scanning of these identifying marks causing the transport means to transport the original into the printing position. At the printing position the printing is carried out by means of an automatic exposure control arrangement.

In some arrangements having automatic transport means, identifying marks are applied to the film only to indicate those originals whose transparency indicates that a satisfactory copy can be achieved. However, there are some films in which a perforation is affixed to each original prior to the exposure of the film. Therefore, the perforation or identifying mark does not indicate whether or not the original is suitable for copying. Thus, for such films, completely unexposed or considerably overexposed originals may be printed.

SUMMARY OF THE INVENTION

It is an object of the present invention to furnish a printing arrangement as described above, but having means for identifying over or underexposed originals. Further, such over or underexposed originals are to be transported past the printer without a copy being made.

The present invention thus comprises a photographic arrangement which has transport mans transporting elongated carrier means, said elongated signal carrier means having a plurality of originals. The transport means transport said elongated signal carrier means along a predetermined path. Along this predetermined path is situated a printing arrangement. Further, prior to the printing arrangement in the direction of motion of the elongated signal carrier means, is a photoelectric arrangement for measuring the average transparency of at least a substantial part of the surface of each of said originals and furnishing a transparency signal corresponding thereto. Comparator means compare the transparency signal to a reference signal which indicates a predetermined transparency value. When the comparator means furnish a comparator output signal indicating a predetermined relationship between the transparency signal and the reference signal, control mans activate the transport means to transport the corresponding original past the printer without a copy being made.

In a preferred embodiment of the present invention, the comparator means compare the transparency signal to a first and second reference signal respectively signifying a maximum and minimum acceptable transparency. If the measured transparency is outside of this range, the transport means, as stated above, transport the original past printer without the making of a copy.

Measuring of the average transparency value in at least one large representative portion of the original allows easy determination whether the original is over or underexposed to the extent that a copy of satisfactory quality cannot be made. Thus, no unsatisfactory prints or copies are produced by the above-described arrangement, since originals whose transparency value lies outside of the predetermined limit are not reproduced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
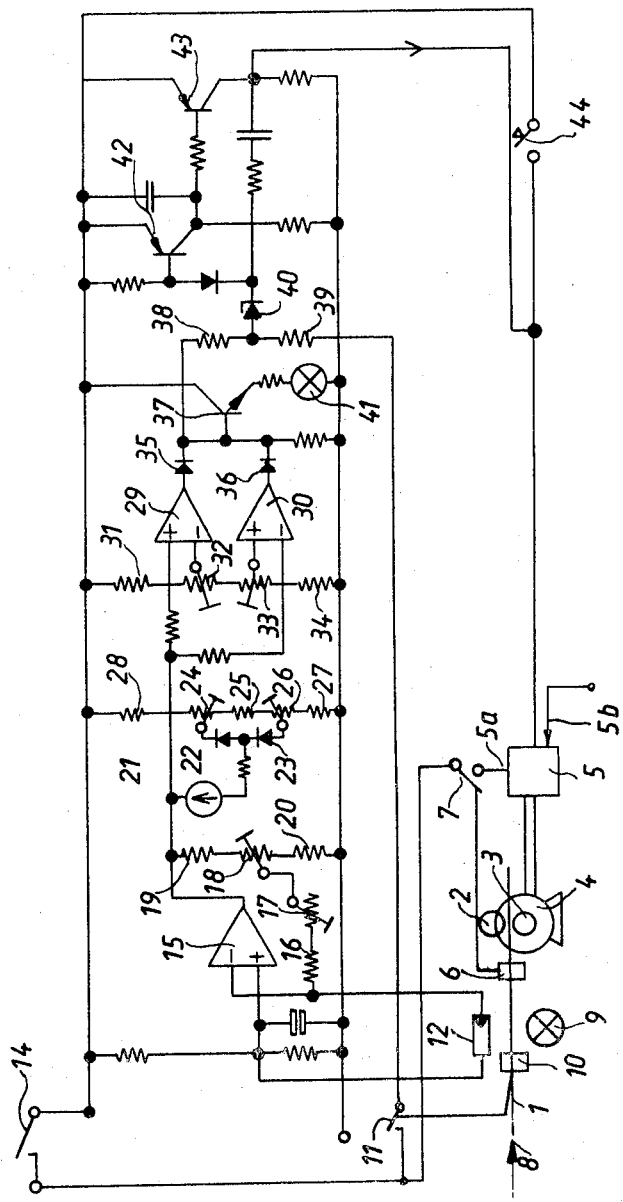
FIG. 1 is a schematic representation of the printing arrangement including a circuit diagram of the photoelectric measuring arrangement.

A preferred embodiment of the present invention will now be described with reference to the drawing.

In FIG. 1, reference numeral 1 denotes an exposed and developed photographic film. Perforations, serving as identifying marks, are on the film, to indicate the position of each original. The film, herein also referred to as elongates carrier means, is transported in a stepwise fashion by mans of transport rolls 2 and 3 through a conventional printing arrangement which is not shown in the drawing. Transfer rolls 2 and 3 are maintained in the desired position relative to each other by means of springs, and the lowest of the two transport rolls is driven by a motor 4. Control means comprise a switching arrangement 5 which may for example comprise a flip-flop or other bistable stage. When the bistable stage is in a first state, a connection between motor 4 and its source of energization exists, while, when the bistable stage is in the second state, the motor is de-energized. The switching arrangement 5 is herein referred to as control means. It has an input 5a, which is activated by means of first sensing means which sense identifying marks on the elongated signal carrier means and furnish a first marking signal for each identifying mark being sensed. In response to a so-sensed mark, a switch 7 is activated to supply a voltage to input 5a of the switching arrangement 5 to cause motor 4 to stand still when the presence of an identifying mark indicates that an original is in the proper printing position in the printer. A further input 5b is activated upon the end of the printing process.

Prior to the printing location or reproducing location is a measuring action. At this measuring location, a light source 9 is positioned underneath the film. This light source enables a visual inspection of an original to be carried out. For example, the operator may judge the original as to its transparency and any defects in its color, thereby determining whether or not a satisfactory copy can be made. Of course, under fully automatic operation, such a visual inspection would not be carried out. At the measuring location there are second sensing means, denoted by reference numeral 10, which may be identical in function to the first sensing means 6. However, these second sensing mans serve to stop the transport in order to allow a visual inspection of the original in the measuring location, even if no original is in the printing location. The second sensing means 10 control a normally open switch 11, whose closing constitutes a second marking signal which will be discussed further below.

Figure 2:
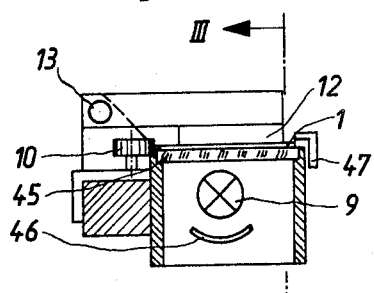
FIG. 2 is a cross-section of part of the printing arrangement.
Figure 3:
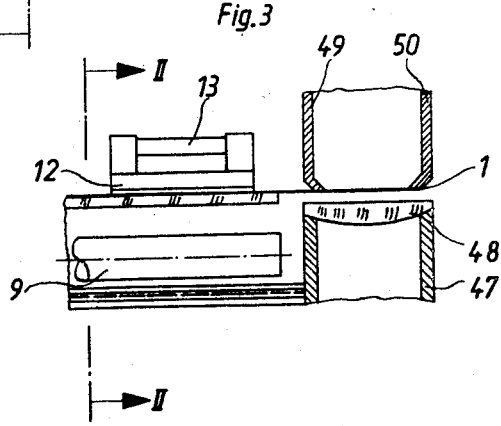
FIG. 3 is a longitudinal secton of the portion of the printer shown in FIG. 2.

As shown in FIGS. 2 and 3, a photocell 12 having a relatively large surface corresponding to at least half the surface of each original, is positioned above the film opposite the source of light 9. The light-sensitive surface of photocell 12 is positioned in close proximity to the plane of the film and parallel thereto. As shown in FIG. 2, the photocell is hingeably mounted (13) so that a visual inspection of the original may be carried out. Of course, the photocell is not required for such visual inspection.

The circuit processing the transparency signal, namely the signal furnished by photocell 12, is shown in FIG. 1. First, a main switch 14 must be closed in order to energize the circuit. The two terminals of photocell 12 are connected to two inputs of an operational amplifier 15. One of these inputs is connected to the output of the operational amplifier via a resistance chain 16, 17, 18, 19 and 20. These resistances furnish a feedback path and serve to adjust the amplification of the operational amplifier to the existing operating conditions. In particular, adjustable resistance 17 serves to fix the maximum current from the photocell when the most light received, that is for a totally unexposed negative. For this value, the output voltage of operational amplifier 5 passes from positive values to zero. This voltage is indicated on a moving-coil instrument 21 (additional indicating means) which will be further described below. Resistance 18 serves to adjust the slope of the amplifier transfer characteristic in such a manner that for the smallest transparency signal the output voltage of the amplifier is just equal to the threshold value of the subsequent stage.

The above-mentioned moving-coil instrument 21 has a terminal connected to the output of amplifier 15. The signal at this first terminal thus corresponds to the amplified transparency signal. It other terminal is connected via chain of diodes 22 and 23 and a resistance chain 24, 25, 26, 27 and 28 to a voltage source furnishing such a voltage that the center region is suppressed. Thus, in the main voltages are indicated which lie outside of predetermined limits which will be discussed further below.

The output of amplifier 15 is further connected to the positive input of a first comparator 29 and to the negative input of a second comparator 30. The first reference signal, namely the negative voltage for the second input of comparator 29 as well as the second reference signal, namely the positive reference voltage for amplifier 30, are supplied by a voltage divider comprising resistors 31, 32, 33, and 34. Resistors 32 and 33 are adjustable. The output of the first comparator means, namely amplifier 29, is connected via a diode 35 to the base of a transistor 37, while the output of the second comparator means, namely amplifier 30, is connected to the base of transistor 37 via a diode 36. These diodes serve to protect the amplifiers from overvoltages. The two diodes constitute an OR-circuit. First indicator means comprise the transistor 37, whose collector is connected to the source of energy via switch 14 and whose emitter is connected to the terminal of the energy or voltage source through a resistance and an indicator lamp 41. The common output of comparator 29 and 30 is also connected via a resistance 38 to a diode 40. The anode of diode 40 is also connected to a resistor 39, resistors 38, 39 and diode 40 constituting an AND-circuit. The free terminal of resistor 39 is connected to switch 11. The output of the AND-circuit, namely the cathode of diode 40, is connected with two further amplifying transistors 42 nd 43 whose output in turn controls the switch means 5.

FIGS. 2 and 3 show the mechanical construction of the measuring station and the printing station. Film 1 is transported through the measuring location on a glass plate 45 under which is located light source 9 with a reflector 46. The side edges of film 1 are guided by means of a suitable arrangement 47. The sensing means 10 are arranged at the rear edge of film 1 for sensing the identifying marks. FIG. 3 shows the above-described parts and also a schematically indicated housing with a mirror arc lamp having a light-conductive tunnel 47 comprising interior mirrored surfaces and having a diffusing disk 48. Substantially vertically mounted masks 49 and 50 limit the region of the original to be scanned in the direction of film transport.

The above-described arrangement operates as follows:

Under normal automatic transport conditions, the motor 4 transports the film via rollers 2 and 3 until the sensing means 6 sense an identifying mark signifying that an original is properly positioned within the printer. The motor is reactivated via input 5b by a known conventional arrangement after the printing process is completed and continues to operate until sensing means 6 sense the next identifying mark. If an operator desires, the original can be inspected at the measuring station by the use of light source 9 and an improperly exposed negative can be passed through the printer without printing by means of the depression of switch 44. If switch 44 is closed, the next film transport step extends past the next mark sensed by sensing means 6, thereby skipping the undesirable original. Motor 4 is when stopped only after the second mark is sensed by sensing means 6.

Under completely automatic operation, that is when no operator is available for the operation of switch 44, the photocell 12 is rotated into the position shown in FIGS. 2 and 3 wherein it is operative. Further, contact 14 must of course be closed. Under these conditions, a representative region of each original, including at least half of said original and preferably the middle portion thereof, is measured by photocell 12 in order to determine its average transparency. The transparency signal generated by photocell 12 is applied, after amplification by the operational amplifier 15, to the inputs of comparators 29 and 30. The wiper arm of resistance 32 is so adjusted that amplifier 29 yields a positive signal when the output voltage of amplifier 15 is larger than the maximum permissible transparency for a reproducible original, that is when the original is excessively underexposed. Resistance 33 is so adjusted that comparator 30 yields a positive signal for excessively overexposed originals. Since both of these positive or "1" signals are to have the same effect, namely the skipping of the original having this transparency, the output s of comparators 29 and 30 are connected to an OR-circuit, whose output is made visible via lamp 41 and is also applied to the input of an AND-circuit.

It is the function of AND-circuit 38, 39, and 40 that a signal applied to its first input, namely the output of the comparators, only results in a skipping of an original when, simultaneously with the comparator output signal, the second marking signal, resulting from the operation of switch 11 is present. This means that only when the transparency signal results from the correct region of the original is the comparator output signal used to cause the printing of the original to be prevented. The signal at the output of the AND-circuit, which signifies that the transparency of the original is outside of the prescribed limits, is applied via transistors 42 and 43 to an input of the control means 5 which in turn operates the transport means in the same manner as under conditions of a depression of the switch 44. Specifically, the transport means undergo a step comprising two normal transport steps, thereby skipping the undesirable original.

While the invention has been illustrated and described as embodied in particular measuring and comparator circuits and transports means, it is not limited to the details shown, since various modifications and structural and circuit changes may be made without departing in any way from the spirit of the present invention.

Without further analysis, the foregoing will so fully reveal the gist of the present invention that others can by applying current knowledge readily adapt it for various applications without omitting features, that from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is set forth in the appended

1. Photographic apparatus, comprising, in combination, elongated carrier means having a plurality of originals; transport means transporting said elongated carrier means in a predetermined path; reproducing means positioned along said predetermined path; photoelectric means positioned at a measuring location prior to said reproducing means along said predetermined path in the direction of motion of said elongated carrier means, for measuring the average transparency of at least a substantial part of each of said originals and furnishing corresponding transparency signals; comparator means comparing each of said transparency signals wit a reference signal and furnishing a comparator output signal when said transparency signal has a predetermined relationship to said reference signal; and control means interconnected between said comparator means and said transport means, for operating said transport means to move the corresponding one of said originals past said reproducing means without exposure in response to said comparator output signal.

2. Apparatus as set forth in claim 1, wherein said elongated carrier means comprise a plurality of identifying marks each positioned in a predetermined location relative to a corresponding one of said originals; sensing means sensing said identifying marks and furnishing corresponding first marking signals; and wherein said transport means comprise step-wise transport means transporting an original into operative proximity with said reproducing means in response to each of said first marking signals.

3. Apparatus as set forth in claim 2, wherein said comparator means comprise first comparator means comparing said transparency signal to a first reference signal signifying a predetermined maximum transparency; second comparator means comparing said transparency signal to a second reference signal corresponding to a predetermined minimum transparency; and wherein said comparator output signal signifies a transparency exceeding said maximum transparency or less than said minimum transparency.

4. Apparatus as set forth in claim 3, wherein said photoelectric means comprise a photoelectric cell having a surface substantially corresponding to the surface of said originals.

5. Apparatus as set forth in claim 4, wherein said photoelectric means further comprise mounting means mounting said photoelectric cell above said elongated signal carrier means, and illuminating means positioned under said elongated signal carrier means.

6. Apparatus as set forth in claim 5, wherein said mounting means comprise means rotatably mounting said photocell; thereby permitting visual inspection of said original.

7. Apparatus as set forth in claim 3, wherein said first comparator means has a positive input receiving said transparency signal and a negative input receiving said first reference signal; wherein said second comparator means has a negative input receiving said transparency signal and a positive input receiving said second reference signal; wherein said first and second comparator have, respectively, a first and second comparator output; further comprising OR-gate means having a first and second input respectively connected to said first and second comparator output, and an OR-gate output.

8. Apparatus as set forth in claim 7, further comprising indicator means connected to said OR-gate output.

9. Apparatus as set forth in claim 8, wherein said indicator means comprise first transistor means having a base connected to said OR-gate output and an emitter; and an indicator lamp connected to said emitter of said first transistor.

10. Apparatus as set forth in claim 7, further comprising second sensing means positioned at said measuring location, for sensing said identifying marks and furnishing second sensing signals in response thereto; further comprising AND-gate means having a first input connected to said second sensing means, a second input connected to said OR-gate output, and an AND-gate output; and switch means interconnected between said AND-gate mans and said transport means for energizing said transport means in response to a signal at said AND-gate output.

11. Apparatus as set forth in claim 1, further comprising additional indicator means connected to said photoelectric means for furnishing an indication of said transparency.

12. Apparatus as set forth in claim 11, wherein said additional indicator means comprise suppressed center range indicator means.

* * * * *